Figure 1:
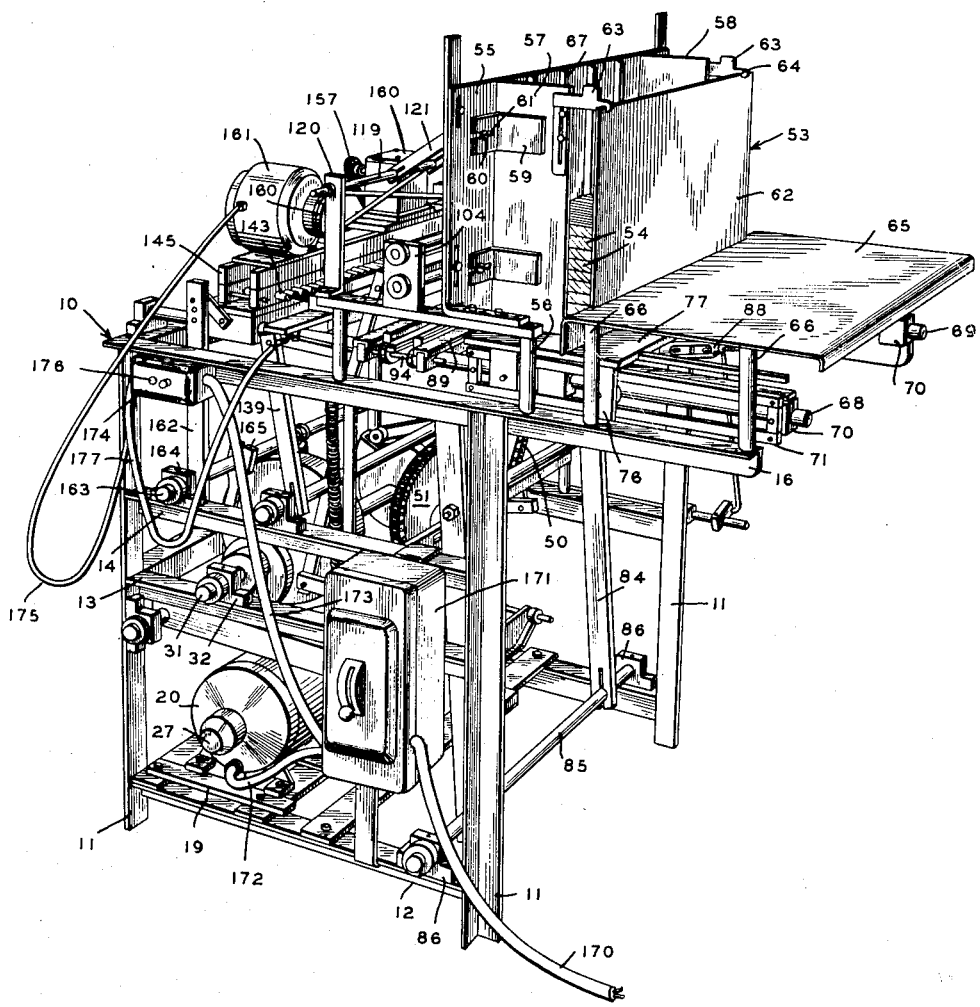

July 17, 1956

R. E. NOECKER ET AL 2,754,830

CIGAR PIERCING MACHINE

Filed Feb. 25, 1952

12 Sheets-Sheet 1

INVENTORS.
ROY E. NOECKER
BY VICTOR FELDPAUSCH

ATTORNEY

July 17, 1956

R. E. NOECKER ET AL 2,754,830

CIGAR PIERCING MACHINE

Filed Feb. 25, 1952

12 Sheets-Sheet 3

INVENTORS.
ROY E. NOECKER
BY VICTOR FELDPAUSCH

ATTORNEY

July 17, 1956

R. E. NOECKER ET AL 2,754,830

CIGAR PIERCING MACHINE

Filed Feb. 25, 1952

12 Sheets-Sheet 4

INVENTORS.
ROY E. NOECKER
BY VICTOR FELDPAUSCH

ATTORNEY

July 17, 1956

R. E. NOECKER ET AL 2,754,830

CIGAR PIERCING MACHINE

Filed Feb. 25, 1952

12 Sheets-Sheet 5

*INVENTORS*
ROY E. NOECKER
BY VICTOR FELDPAUSCH

ATTORNEY

July 17, 1956

R. E. NOECKER ET AL 2,754,830

CIGAR PIERCING MACHINE

Filed Feb. 25, 1952

12 Sheets-Sheet 6

INVENTORS
ROY E. NOECKER
BY VICTOR FELDPAUSCH

A. Yates Dowell

ATTORNEY

July 17, 1956

R. E. NOECKER ET AL 2,754,830

CIGAR PIERCING MACHINE

Filed Feb. 25, 1952

12 Sheets-Sheet 7

INVENTORS
ROY E. NOECKER
VICTOR FELDPAUSCH
BY

ATTORNEY

July 17, 1956

R. E. NOECKER ET AL 2,754,830

CIGAR PIERCING MACHINE

Filed Feb. 25, 1952

12 Sheets-Sheet 8

INVENTORS
ROY E. NOECKER
BY VICTOR FELDPAUSCH

ATTORNEY

July 17, 1956

R. E. NOECKER ET AL 2,754,830

CIGAR PIERCING MACHINE

Filed Feb. 25, 1952

12 Sheets-Sheet 10

INVENTORS
ROY E. NOECKER
BY VICTOR FELDPAUSCH

ATTORNEY

INVENTORS
ROY E. NOECKER
VICTOR FELDPAUSCH
BY A. Yates Dowell
ATTORNEY

July 17, 1956   R. E. NOECKER ET AL   2,754,830
CIGAR PIERCING MACHINE
Filed Feb. 25, 1952   12 Sheets-Sheet 12
FIG. 16
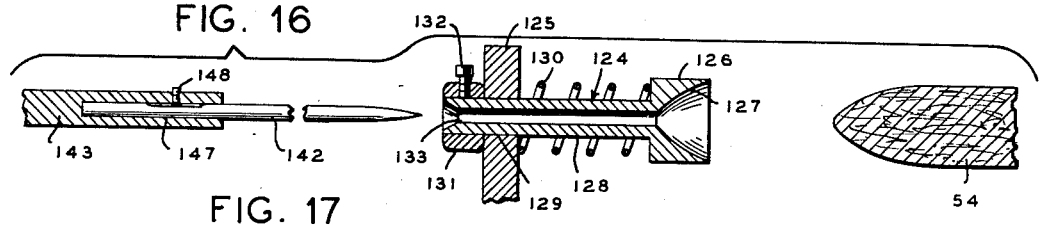
FIG. 17
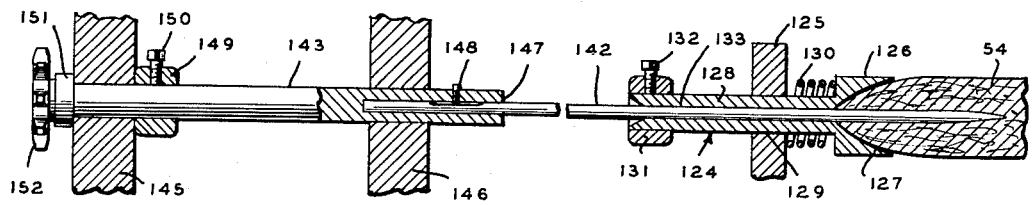
FIG. 18
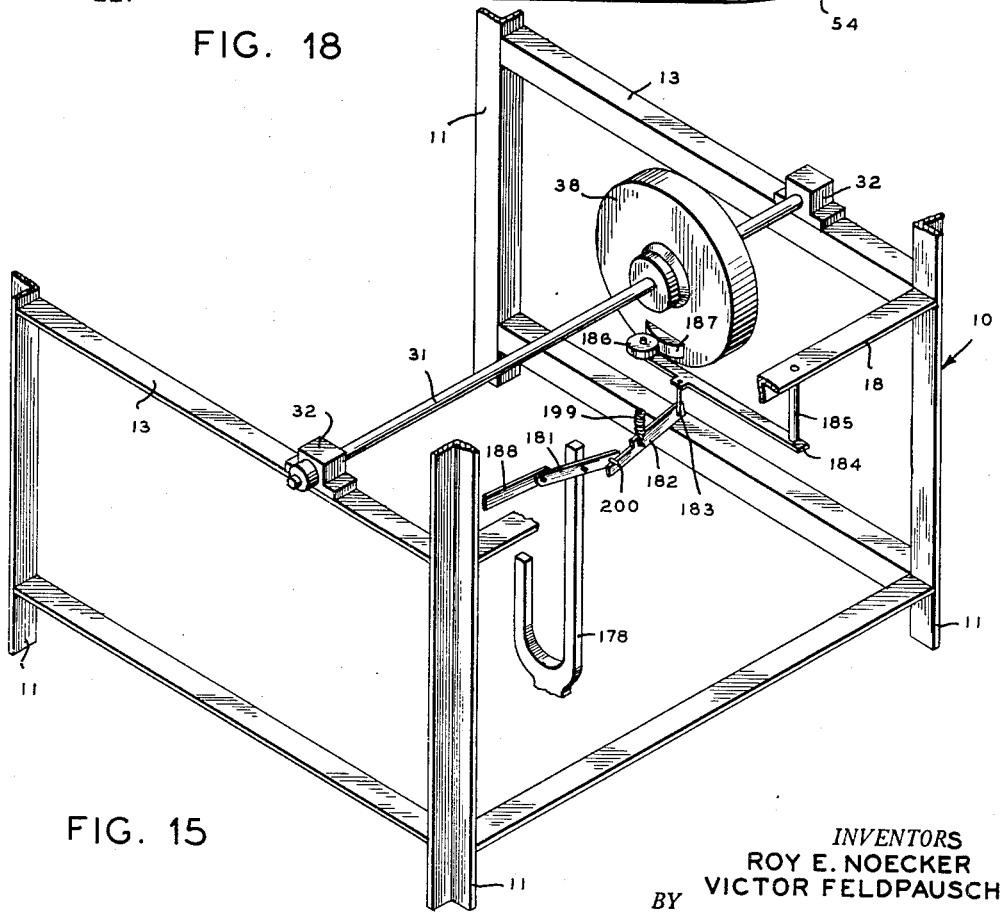
FIG. 15
INVENTORS
ROY E. NOECKER
BY VICTOR FELDPAUSCH
ATTORNEY

United States Patent Office 2,754,830
Patented July 17, 1956

2,754,830
CIGAR PIERCING MACHINE

Roy E. Noecker and Victor Feldpausch, Evansville, Ind., assignor to H. Fendrich, Incorporated, Evansville, Ind., a corporation of Indiana Application February 25, 1952, Serial No. 273,183

15 Claims. (Cl. 131—254)

This invention relates to the manufacture of tobacco products and more particularly to an apparatus for piercing the ends of cigars in order to eliminate the necessity for clipping or cutting the ends thereof by the user.

Heretofore numerous machines have been proposed for this purpose, but the majority of these were relatively slow and inefficient in that one cigar was pierced at a time and also many of these machines were extremely complicated and introduced costly problems of maintenance. Furthermore, these prior art machines had a tendency to damage the cigars sufficiently to result in discarding the same, since, as is well known, cigars are relatively fragile and must be marketed in substantially perfect condition in order to be acceptable to the user.

It is therefore an object of this invention to provide a cigar piercing machine which is substantially fully automatic in operation requiring only that a sufficient supply of cigars be fed thereto and a machine which may be conveniently synchronized with banding and packaging machines to which the pierced cigars may be conveyed.

It is a further object of the invention to provide a cigar piercing machine in which the cigars are fed, pierced and conveyed away from the machine in such a manner as to prevent damage thereto.

Another object of the invention is the provision of a cigar piercing machine incorporating means for preventing damage to the cigars due to inaccuracies in size.

A still further object of the invention is the provision of a cigar piercing machine for rapidly and efficiently piercing the ends of cigars and delivering the same for a subsequent operation without damage thereto.

A further object of the invention is the provision of a cigar piercing machine which may be constructed from readily available materials and which will not be subject to frequent breakdowns resulting in relatively high maintenance costs.

Figure 2:
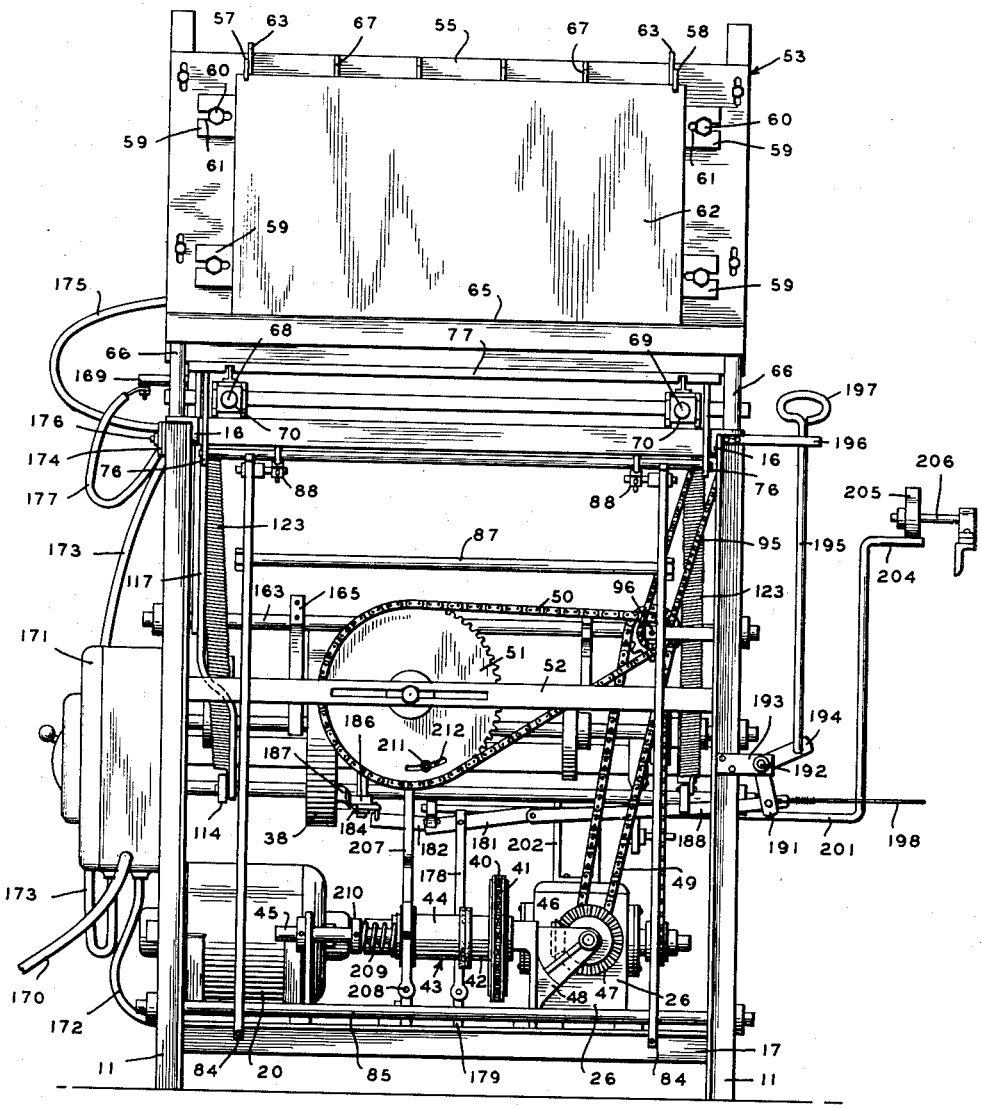
Figure 3:
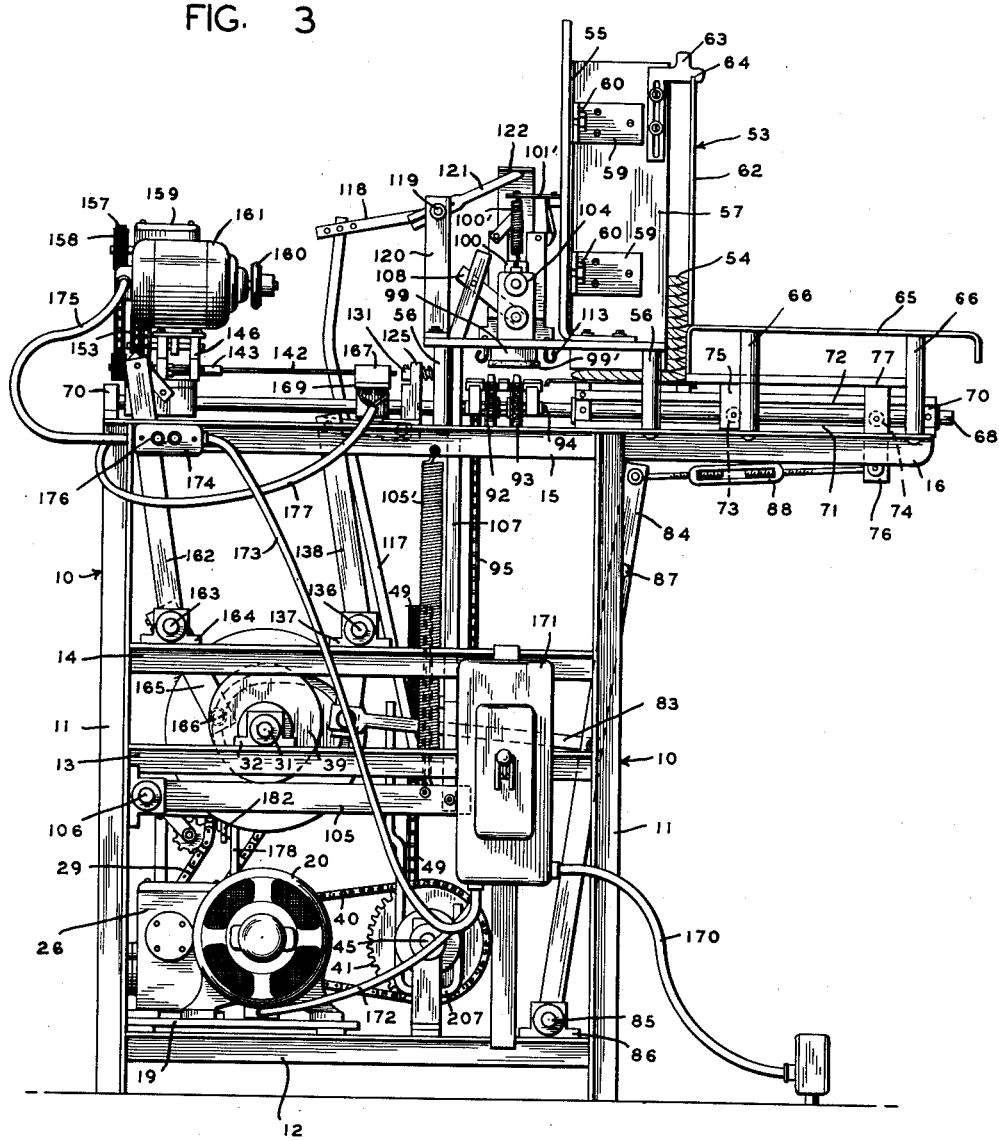
Figure 4:
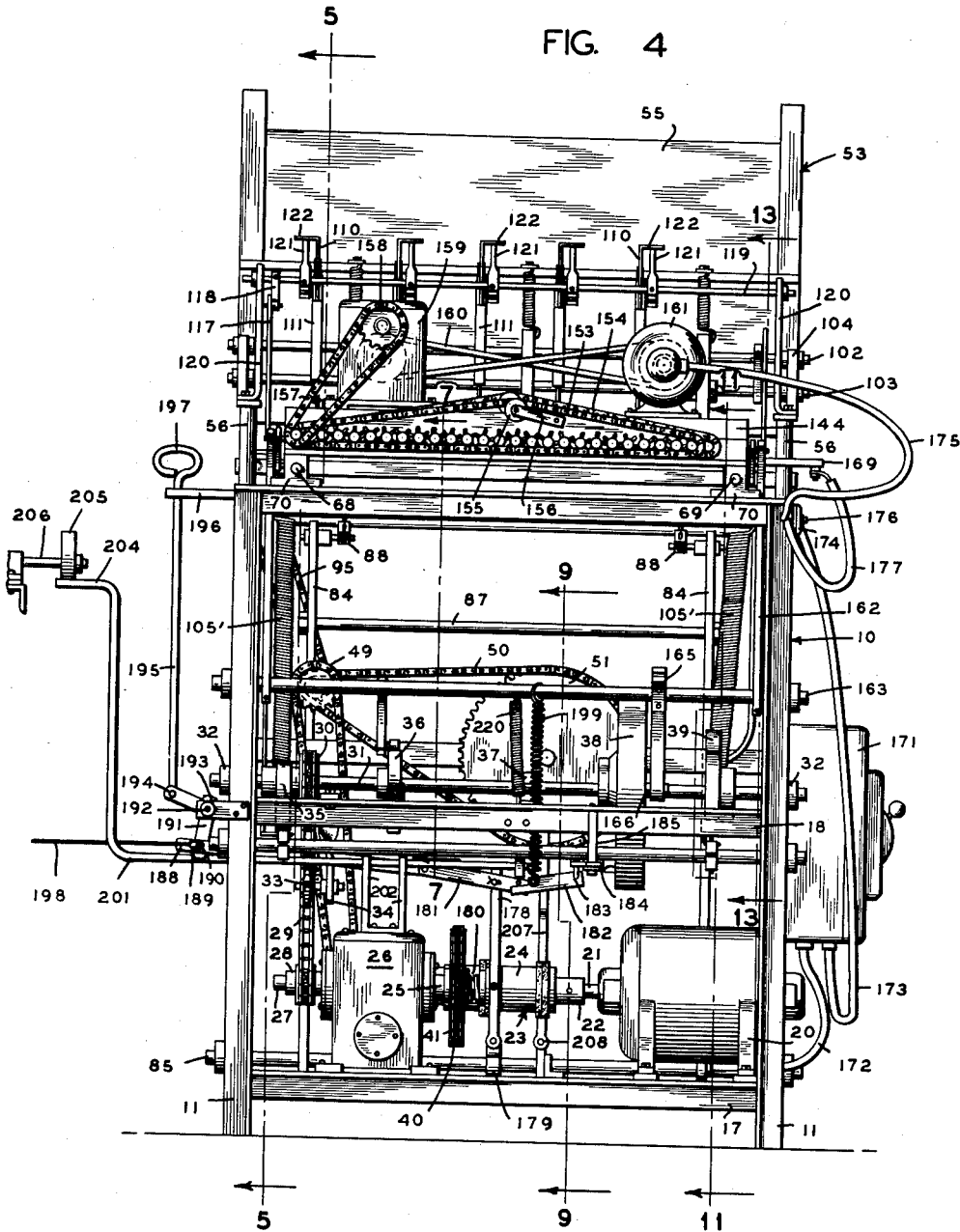
Figure 5:
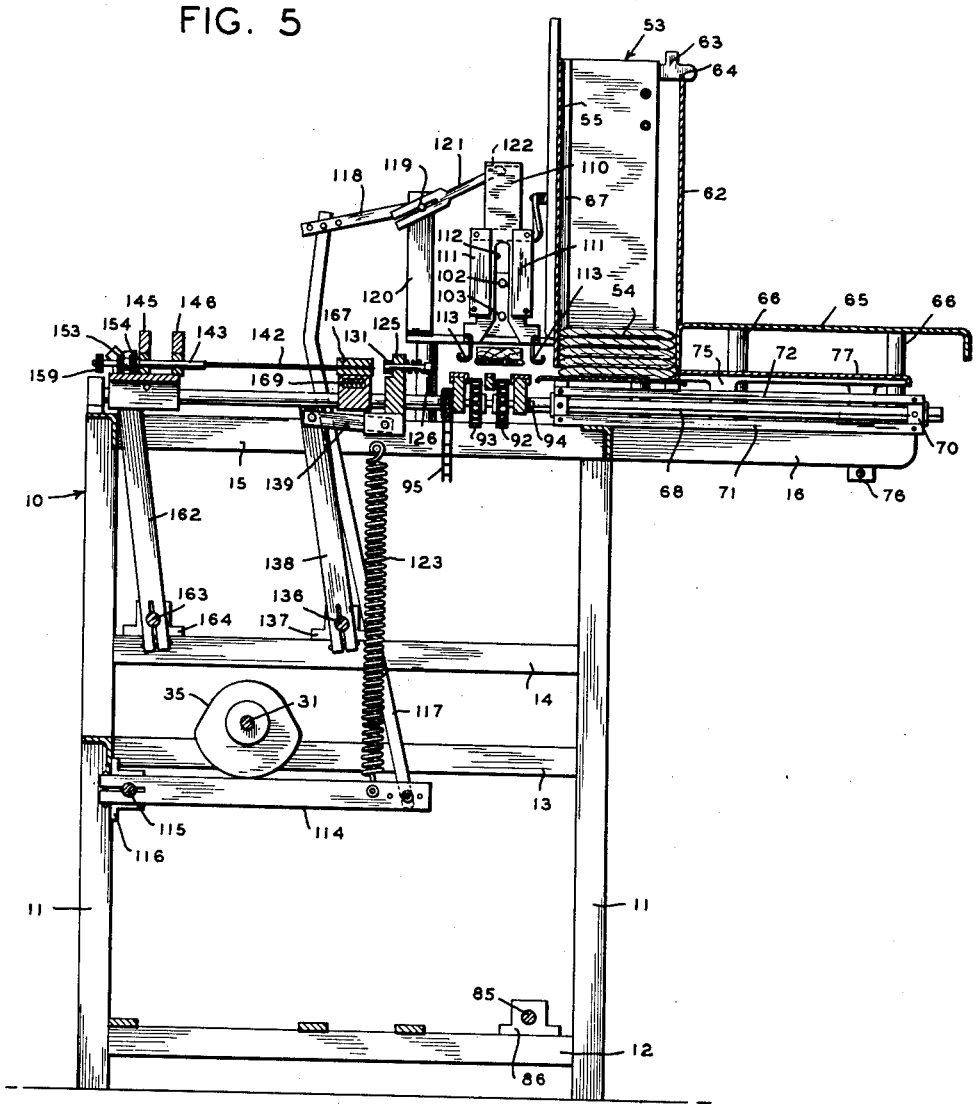
Figure 6:
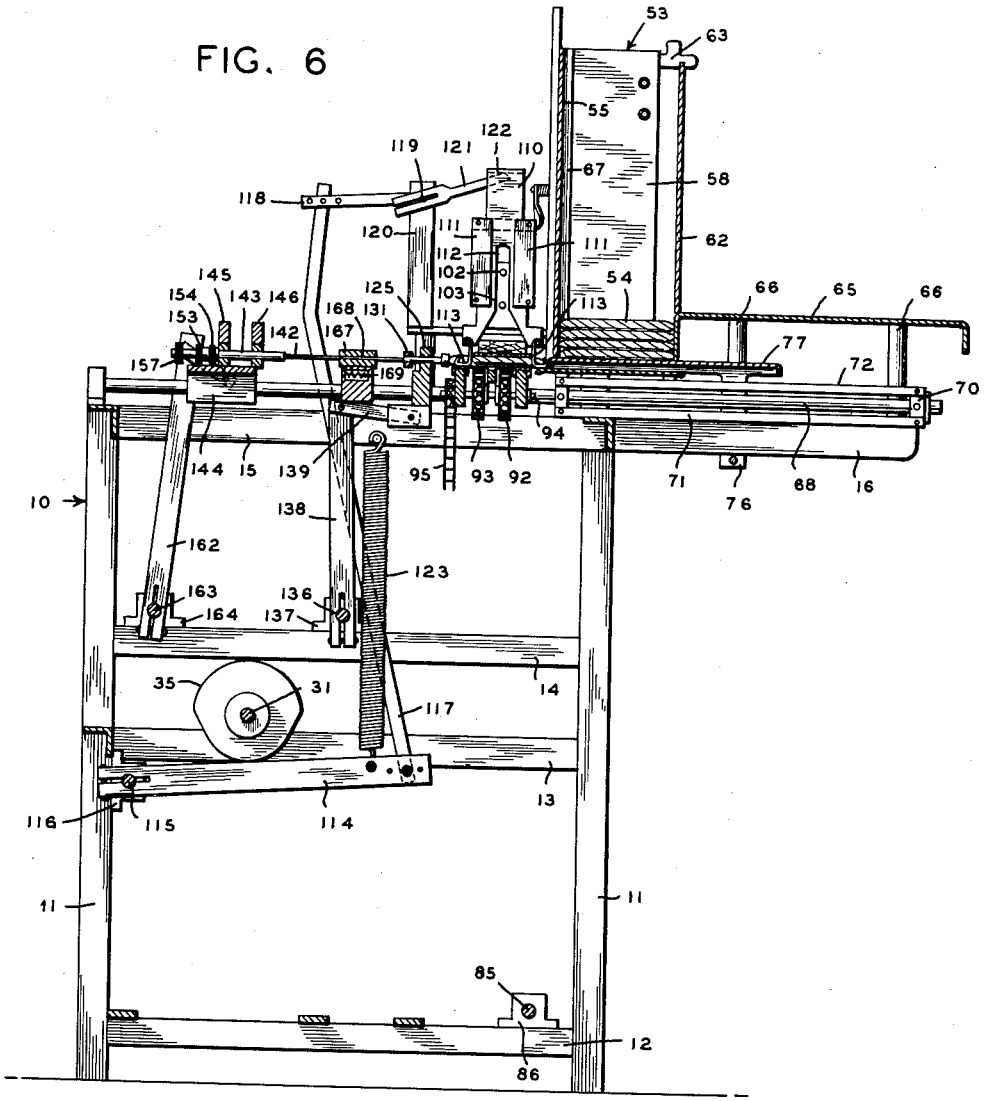
Figure 7:
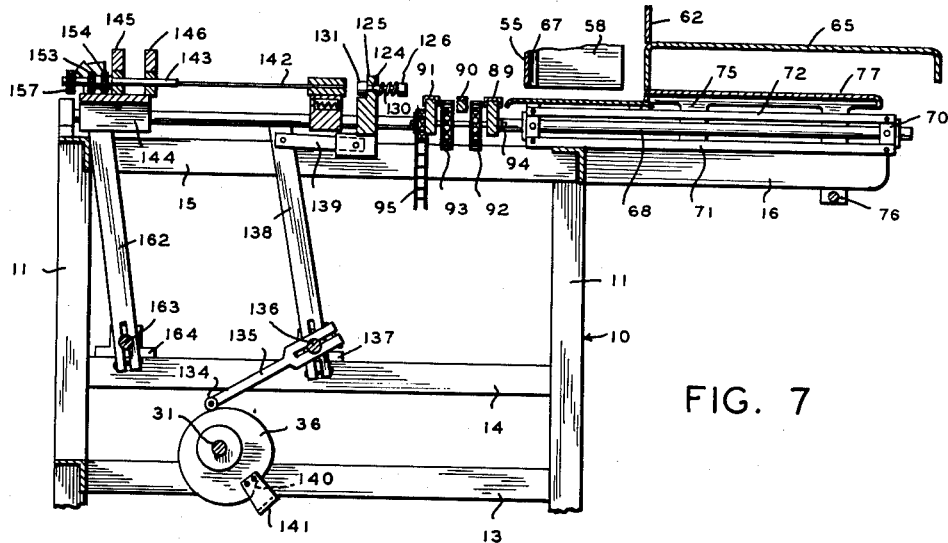
Figure 8:
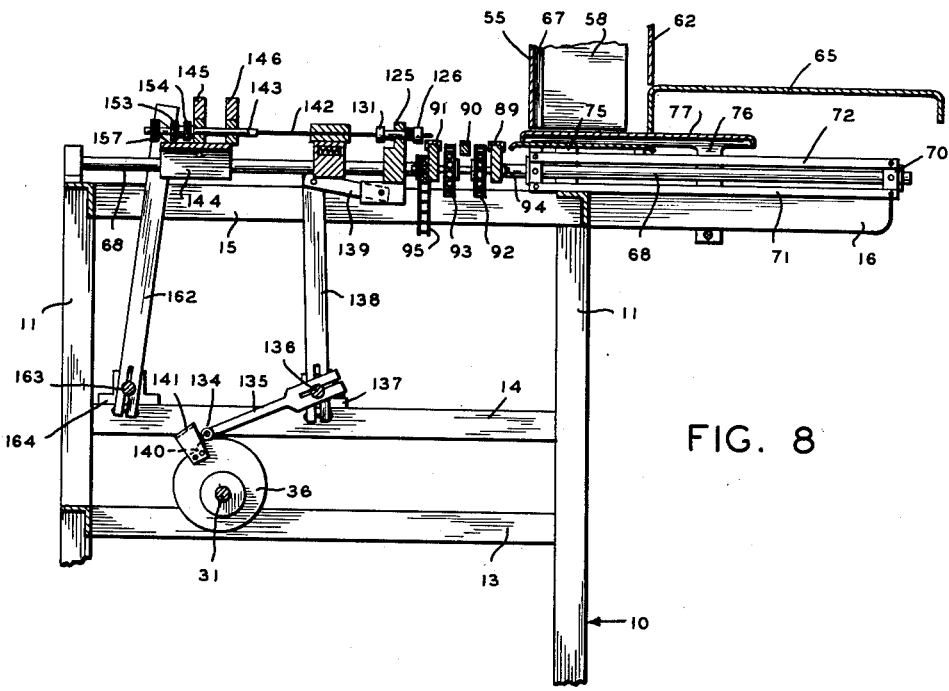
Figure 9:
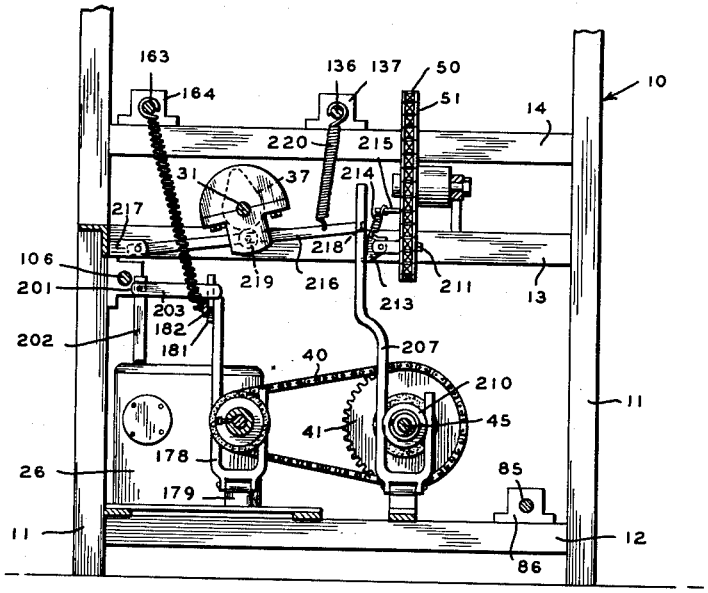
Figure 10:
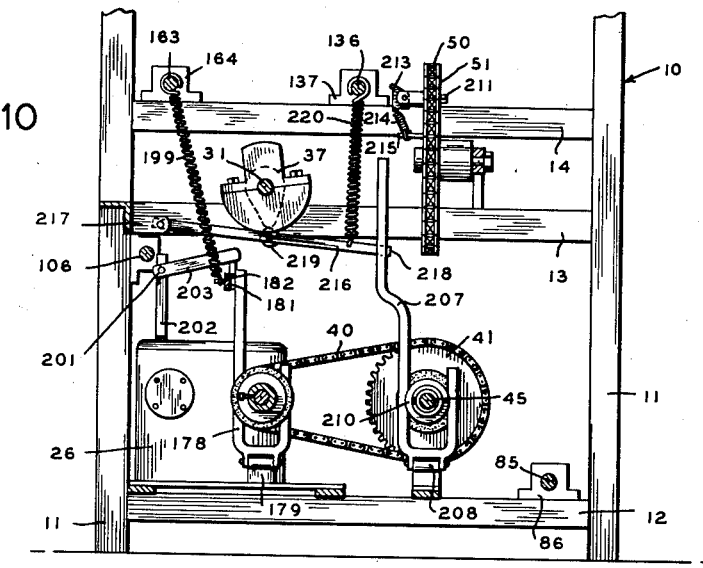
Figure 11:
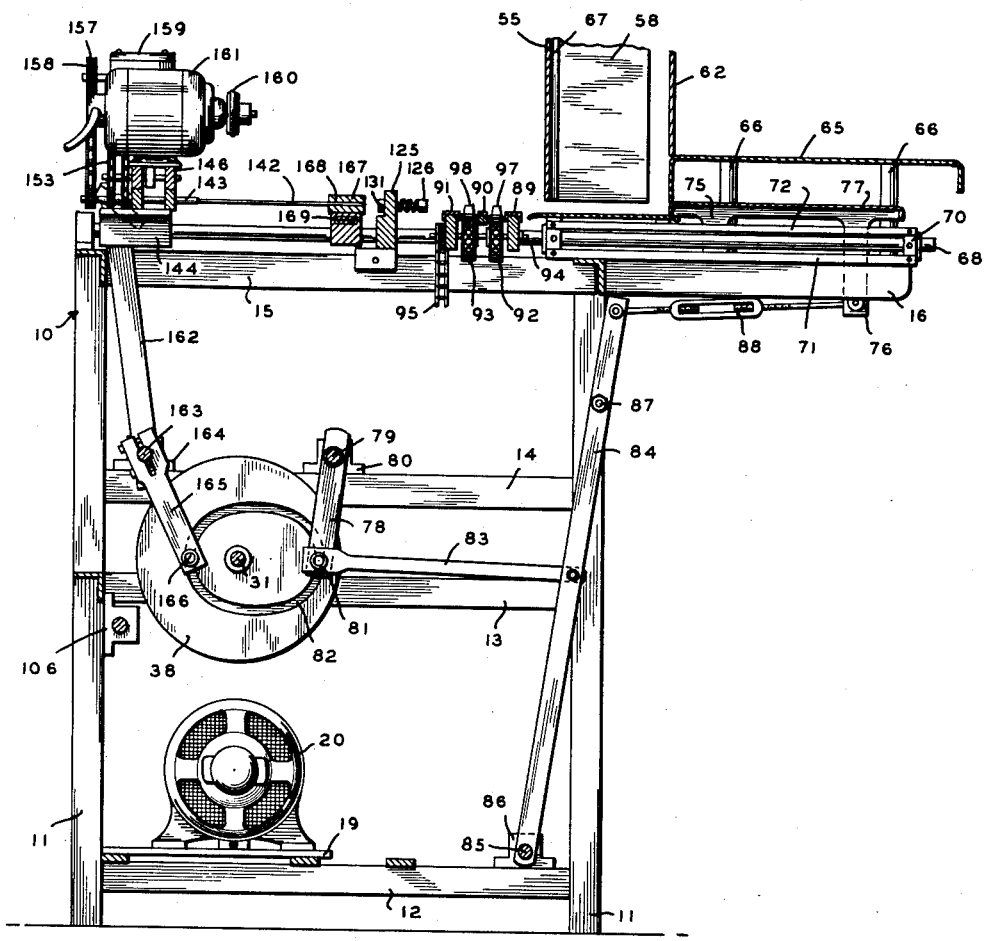
Figure 12:
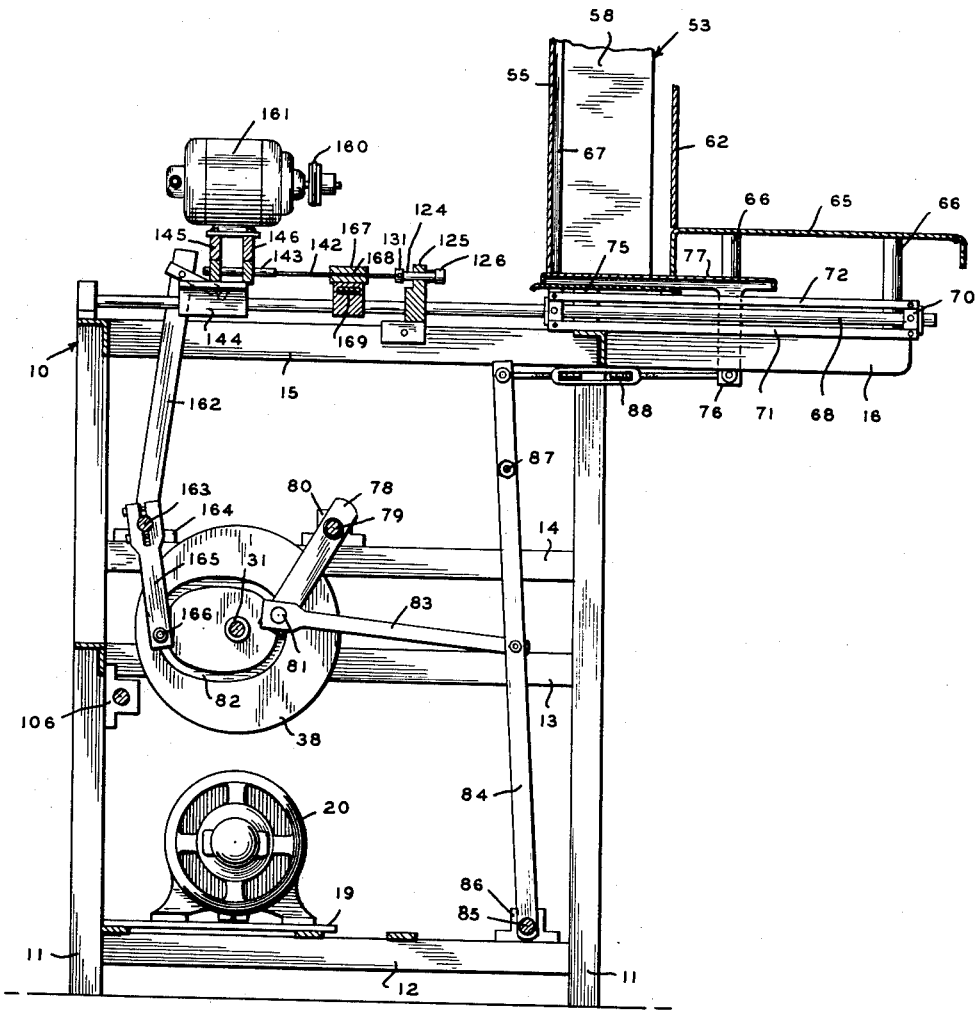
Figure 13:
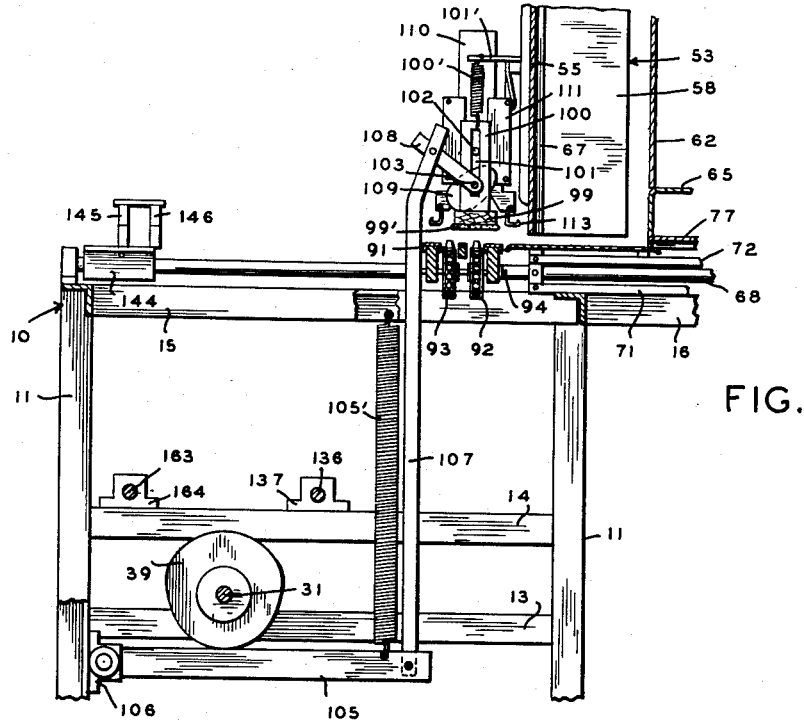
Figure 14:
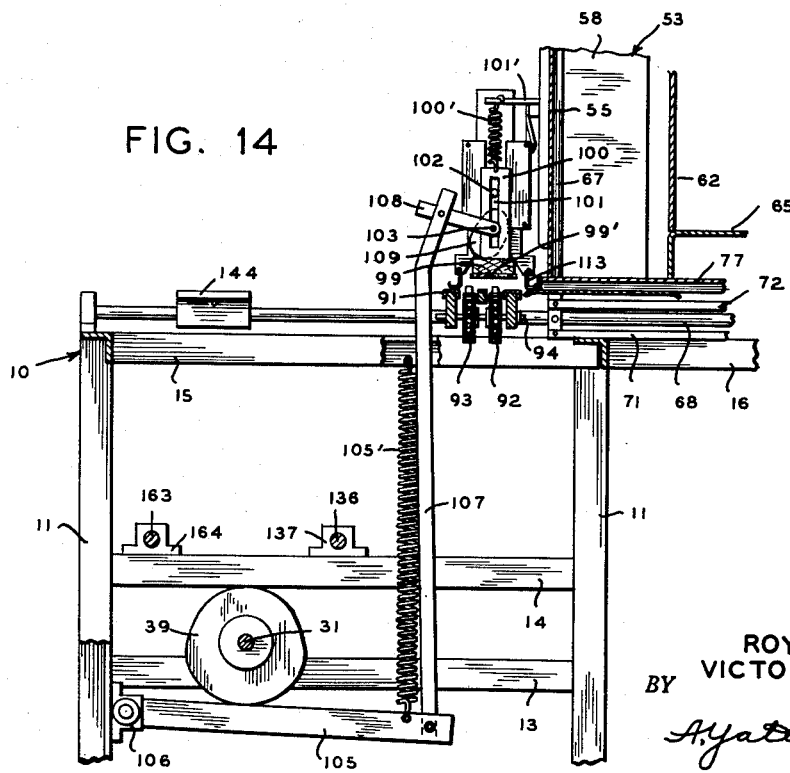

Further objects and advantages of the invention will be apparent from the following description taken in conjunction with the accompanying drawings wherein:

Fig. 1 is a view in perspective of the cigar piercing machine of this invention;

Fig. 2, a front elevational view of the cigar piercing machine of Fig. 1;

Fig. 3, a side elevational view of the cigar piercing machine of this invention;

Fig. 4, a rear elevational view of the cigar piercing machine of this invention;

Fig. 5, a sectional view taken on the line 5—5 of Fig. 4;

Fig. 6, a sectional view similar to Fig. 5 but showing a group of cigars in position for piercing, and with the cigar clamping means in operative position;

Fig. 7, a sectional view on the line 7—7 of Fig. 4;

Fig. 8, a sectional view similar to Fig. 7 and showing the cigar centering means in operative position;

Fig. 9, a sectional view on the line 9—9 of Fig. 4, and showing the drive mechanism and control therefor for the cigar discharging mechanism;

Fig. 10, a view similar to Fig. 9 and showing the cigar discharge mechanism during operation thereof;

Fig. 11, a sectional view on the line 11—11 of Fig. 4 and showing the operating mechanism for the cigar feeding means as well as the operating mechanism for advancing the piercing needles;

Fig. 12, a view similar to Fig. 11 and showing the cigar feeding means and the piercing needles in another position;

Fig. 13, a sectional view on a line 13—13 of Fig. 4 and showing the operating mechanism for the cigar clamping means;

Fig. 14, a view similar to Fig. 13 and showing the cigar clamping means in clamping position;

Fig. 15, a fragmentary perspective view showing the main clutch control mechanism;

Fig. 16, an exploded sectional view showing the cigar centering mechanism and piercing needle;

Fig. 17, a sectional view showing the cigar centering means and the piercing needle in piercing position; and Fig. 18, a sectional view showing a cigar after piercing in the apparatus of this invention.

With continued reference to the drawing, there is shown a frame 10 substantially rectangular in shape and composed of uprights 11 joined together by pairs of cross members 12, 13 and 14. An upper pair of cross members 15 extend outwardly of the front of the machine and provide overhanging portions 16, the purpose of which will be later described. Additional cross members 17 and 18 serve to further strengthen the frame 10 and to provide supports for various elements of the machine.

Supported upon cross members 12 and 17 upon a base 19 is a main drive motor 20 having a power output shaft 21 coupled to the driving member 22 of a clutch 23. The driven member 24 of clutch 23 is connected through a shaft 25 with a speed reducing gear box 26. The power output shaft 27 of gear box 26 carries a sprocket 28 which meshes with a chain 29, this chain in turn engaging a sprocket 30 carried by a cam shaft 31 journalled in bearings 32 mounted upon the cross members 13. Chain 29 is maintained under tension by an idler sprocket 33 journalled on a bracket 34 which in turn is mounted on cross member 18. Cam shaft 31 serves to mount cams 35, 36, 37, 38 and 39, the purpose and operation of which will be later described.

Mounted upon shaft 25 is a sprocket which serves to drive chain 40 in engagement with a sprocket 41 mounted on the driving clutch member 42 of a clutch 43. The driven clutch member 44 of clutch 43 is keyed to a shaft 45 which shaft 45 drives a bevel gear 46 meshing with bevel gear 47 journalled in a bracket 48 mounted upon the front cross member 17. Bevel gear 47 drives a chain 49 which in turn drives a chain 50, engaging a timing sprocket 51, the operation of which will be later described. Sprocket 51 is journalled for rotation on a cross frame member 52.

A hopper 53 is provided for receiving cigars 54 to be pierced and the hopper is of such dimensions that the cigars 54 may be received in layers of twenty-five to each layer. Hopper 53 comprises an upstanding backing plate 55 supported upon pedestals 56 secured to the upper cross bars 15. Spaced side plates 57 and 58 are secured to the backing plate 55 by angle members 59 and screw threaded fastening means or the like 60. The angle members 59 are provided with slots 61 in order to permit limited adjustment of the side plates 57 and 58 to accommodate groups of cigars having different diameters. A front closure plate 62 is provided which may be conveniently removed to permit the insertion of the cigars 54 into the hopper and plate 62 may be held in position by bracket members 63 provided with notches 64 for receiving the upper edge of closure plate 62 and the lower edge of closure plate 62 is adapted to rest upon a feeding table 65 supported upon pedestals 66 secured to the overhanging portion 16 of the upper cross bars 15. Feeding table 65 is adapted to receive cigars preparatory to placing the same in the hopper 53.

Since the cigars 54 will vary somewhat in diameter and in view of the fact that these variations in diameter might well be additive means is provided in the form of vertically disposed ribs 67 secured to the backing plate 55, ribs 67 being spaced the normal distance occupied by five cigars and in effect separating each layer of twenty-five cigars into groups of five each. Thus any errors occurring in the diameters of the cigars is limited to those errors present in each group of five. Consequently the additive error throughout the width of the hopper 53 is not sufficient to preclude the proper operation of the apparatus.

Extending from front to rear of the machine are spaced supporting rods 68 and 69 which may be carried by blocks 70 secured to the frame 10. Rods 68 and 69 support spaced trackways 71 and 72 which serve to engage rollers 73 and 74 journalled in downwardly extending members 75 and 76 attached to a cigar feed slide 77. Feed slide 77 extends the entire length of the hopper 53 and upon movement of this slide from the front toward the rear of the machine one entire layer of cigars 54 will be ejected from the hopper 53.

As best shown in Figs. 11 and 12 the operating mechanism for the feed slide 77 comprises a bar 78 pivotally mounted on a cross shaft 79 supported in bearing blocks 80 carried by cross frame members 14. Bar 78 is provided with a cam follower 81 disposed in a cam groove 82 provided in a cam 38 carried by cam shaft 31. Bar 78 is also connected by a link 83 with spaced bars 84 pivotally mounted on a cross shaft 85 supported by bearing blocks 86 carried by cross frame members 12. Spaced bars 84 may be held in spaced relationship and further strengthened by a cross bracing member 87. The upper ends of bars 84 are connected to the downwardly depending members 76 carried by feed slide 77 through turnbuckles 88 which permit adjustment of the reciprocating movement of feed slide 77. It will be seen from the above description that upon rotation of cam shaft 31 the cam groove 82 and cam follower 81 riding therein will cause oscillation of bar 78 which in turn through link 83 will oscillate spaced bars 84 about the shaft 85 and thus reciprocate the feed slide 77 to feed layers of cigars from thre hopper 53.

Upon being fed from the hopper 53 by the feed slide 77 a group or layer of cigars 54 is deposited on spaced parallel rails 89, 90 and 91 which are supported upon bars 68 and 69, the rails 89, 90 and 91 extending throughout the width of the machine. Disposed between the outermost rails 89 and 91 and central rail 90 are feed chains 92 and 93 which are trained over sprockets carried by shaft 94 at one side of the machine. The opposite ends of chains 92 and 93 are carried by similar sprockets and a shaft located at the opposite side of the machine. Shaft 94 is driven by a chain 95 which in turn engages a sprocket on shaft 96, this latter shaft being driven by chain 49 from beveled gear 47. The manner of operation of chains 92 and 93 will be later described. Also provided on chains 92 and 93 are lugs 97 and 98 which serve to engage the end cigar of a group of cigars and as the chains move the entire layer or group of cigars will be moved along the rails 89, 90 and 91 and thus ejected from the machine.

In order to properly pierce the cigars 54 after a layer of the same have been deposited on the rails 89, 90 and 91 it is necessary to firmly clamp this layer of cigars in position and maintain the same without movement during the piercing operation. The clamping mechanism for this purpose is best shown in Figs. 5, 6, 13 and 14. This clamping mechanism comprises a clamping bar 99 of wood or other suitable material extending throughout the width of the machine, this clamping bar being supported by vertically disposed slide members 100 having vertical slots 101 therein. These slots 101 serve to receive vertically spaced rods 102 and 103 extending throughout the width of the machine and supported by end brackets 104 carried by the pedestals 56 mounted upon the upper cross members 15. Clamping bar 99 may be provided on its lower surface with a pad of sponge rubber or other suitable material 99' which will engage the cigars 54 and clamp the same firmly in position while still preventing damage thereto.

Clamping bar 99 may be moved downwardly into clamping position by a cam 39 disposed on cam shaft 31, this cam 39 serving to engage a rocker arm 105 pivotally mounted on a bracket 106 secured to the frame 10 of the machine. Rocker arm 105 is connected by means of a link 107 to a second rocker arm 108 which is secured to lower rod 103, this rod carrying spaced cams 109 which serve to engage the upper surface of clamping member 99. Rocker arm 105 is held in engagement with the external surface of cam 39 by a tension spring 105' secured to the rocker arm 105 and to the upper frame member 15. As will be seen from an inspection of Figs. 13 and 14, upon rotation of the cam 39 the rocker arm 105 will move downwardly to rotate the cams 109 in a counterclockwise direction as viewed in these figures, thus moving the clamping bar or member 99 downwardly to the position shown in Fig. 6. The clamping bar 99 is returned to its uppermost position upon clockwise movement of cams 109 by extension springs 100' secured at one end to the slides 100 and at their opposite ends to brackets 101' extending from the backing plate 55 of the hopper 53.

Since it is desirable to maintain the cigars 54 in groups of five as determined by the vertical ribs 67 in the hopper 53 after the cigars have been deposited on the rails 89, 90 and 91 there is provided five spacing means in the form of vertical slides 110 slidably mounted for vertical movement in guides 111 which are secured to the rear wall 55 of the hopper 53. Slides 110 are provided with vertical slots 112 to clear the cross rods 102 and 103 and depending from the lower ends of slides 110 are spacing members 113 in the form of wire loops or the like. The slides 110 move downwardly by gravity and as shown in Fig. 6 the spacing members 113 pass between adjacent cigars positioned on the rails 89, 90 and 91 and maintain the cigars in spaced groups of five.

The operating mechanism for retracting the slides 110 upwardly and withdrawing the spacing fingers 113 from between adjacent cigars is best shown in Figs. 5 and 6 and comprises a rocker arm 114 pivotally mounted on a shaft 115 secured in brackets 116 to the frame 10 of the machine. Rocker arm 114 is engaged on its upper surface by cam 35 carried by cam shaft 31. Connected to rocker arm 114 adjacent the outer end thereof is a link member 117 which in turn is secured to a lever arm 118 mounted on a rock shaft 119 journalled for oscillation in upstanding brackets 120 supported from the pedestals 56. Rock shaft 119 carries fingers 121 which engage beneath overhanging portions 122 on the slides 110. Rotation of cam shaft 31 and cam 35 oscillates the rocker arm 114 in a clockwise direction as shown in Fig. 5 and such movement serves through the link 117, lever arm 118, rock shaft 119 and fingers 121 to raise the slides 110 and the spacing fingers 113 out of engagement with the cigars. Continued rotation of the cam 35 permits rocker arm 114 to move in a counterclockwise direction under the influence of tension spring 123 secured to the frame of the machine and to rocker arm 114 and such upward movement of rocker arm 114 permits downward movement of slides 110 and engagement of spacing fingers 113 between adjacent cigars disposed on the rails 89, 90 and 91.

Centering means for the cigars disposed on rails 89, 90 and 91 is provided in the form of plungers 124 which are slidably mounted in a block 125 which in turn is slidably mounted on the rods 68 and 69. As best shown in Fig. 16 the centering plungers 124 are provided with a head 127 having a substantially conical recess in the outer end thereof. The contour of recess 127 is substantially complementary to the contour of the end of a cigar. Plunger 124 is provided with a reduced shank portion 128 which is slidably mounted in a bore 129 in block 125, the plunger 124 being urged toward the right as viewed in Fig. 16 by a compression spring 130 disposed between the head 126 and the block 125. The position of the head 126 and recess 127 therein is determined by a collar 131 which is secured on the reduced shank portion 128 by a set screw or the like 132, this collar 131 being adjusted to position the head 126 so that cigars will be properly engaged thereby. The shank portion 128 of the plunger 124 is provided with a bore 133 extending therethrough, the purpose of which will presently appear.

There is one plunger 124 provided for each cigar disposed on the rails 89, 90 and 91 which means that in the machine illustrated twenty-five such plungers are provided and these are urged toward the right as viewed in Figs. 5, 6, 7 and 8 and into engagement with cigars disposed on the rails 89, 90 and 91 as shown in Fig. 6 by a cam 36 mounted on cam shaft 31. A cam follower 134 is in engagement with the surface of cam 36 and is carried by a rocker arm 135 mounted on rock shaft 136 extending transversely of the machine and supported on bearing blocks 137 carried by cross frame members 114. Also mounted on rock shaft 136 is a lever arm 138 connected by a link 139 with the block 125.

Rotation of cam 36 to the position shown in Fig. 8 will move the block 125 and plunger 124 carried thereby toward the right and the cavity 127 will engage the end of the appropriate cigar disposed on the rails 89, 90 and 91 and the spring 130 will be compressed to hold the plunger 124 in firm engagement with such cigar. Further movement of the cam 36 will result in the cam follower 34 passing into the recess or relieved portion 140 of the cam 36 and the follower 134 is urged into this recess by an overhanging member or hood 141 which engages the external surface of the cam follower 134 as cam 36 rotates and urges the cam follower 134 into the portion 140 of the cam. Continued motion of the cam results in retracting the block 125 and plungers 124 carried thereby in order to disengage the same from the cigars on the rails 89, 90 and 91 and permit the discharge of cigars from the machine.

The piercing means proper of this machine comprises a plurality of needles 142 which are rotatably carried by spindles 143 mounted for rotation in a carriage 144. Carriage 144 is mounted for sliding movement on rods 68 and 69. Carriage 144 is provided with spaced bars 145 and 146 in which the spindles 143 are journalled for rotation and as shown in Fig. 17 the spindles 143 are provided at one end thereof with a bore 147 for receiving a needle 142, the needle 142 being held in position in the spindle 143 by a set screw or the like 148. Each spindle 143 is provided with a collar 149 secured on the spindle by a set screw or the like 150, collar 149 together with an enlarged portion 151 on the opposite side of bar 145 preventing endwise movement of the spindle 143 in the bars 145 and 146. Also provided on the opposite end of each spindle 143 from the recess 147 is a sprocket 152, alternate sprockets 152 engaging drive chains 153 and 154 to cause rotation of the spindles 143 and the needles 142 carried thereby.

Since there is one needle for each cigar disposed on the rails 89, 90 and 91 or twenty-five in the machine of this invention the spindles 143 must be positioned relatively close together and consequently they are arranged in staggered relationship with the chain 153 engaging the sprockets 152 on every other spindle 143 and the chain 154 engaging the remaining sprockets which are not engaged by chain 153. Chains 153 and 154 are maintained under sufficient tension to prevent slippage on the sprockets by idler rollers 155 carried by brackets 156 pivotally mounted on the carriage 144. Chains 153 and 154 are driven by a sprocket chain 157 which is driven from a sprocket 158 on a speed reducing gear box 159. Gear box 159 is mounted on the carriage 144 and is driven by a belt 160 from a drive motor 161 also mounted on the carriage 144.

As shown in Fig. 11 carriage 144 is reciprocated on rod 68 and 69 by a rocker arm 162 connected thereto and to a rock shaft 163 journalled in bearings 164 mounted on cross members 14 of the frame 10. Also carried by rock shaft 163 is a lever arm 165 having adjacent one end thereof a cam follower 166 engaging in the cam groove 82 of cam 38 carried by cam shaft 31. Upon rotation of cam 38 the lever arm 165 will be oscillated thus oscillating the rock shaft 163 and through the rocker arm 162 reciprocates the carriage 144 and parts carried thereby toward and from cigars positioned on the rails 89, 90 and 91.

In order that needles 142 will properly pierce the cigars 54 these needles must be heated and for this purpose there is provided a bar 167 extending transversely of the machine and mounted on the rods 68 and 69 bar 167 being provided with a plurality of apertures 168 for slidably receiving the needles 142. Disposed beneath the bar 167 in a recess therein is a heating element 169 which may be thermostatically controlled to maintain the bar 167 at the correct temperature. This results in heating of the needles 142 by conduction and maintains the same at the proper temperature to effectively pierce the cigars 54.

Electrical power for the cigar piercing apparatus of this invention may be provided through a cable 170 leading to a master switch 171, there being a conductor 172 leading from switch 171 to main drive motor 20, and there being another cable 173 leading from the main switch 171 to a junction box and control switch 174. From junction box 174 a cable 175 leads to the needle drive motor 161 and the switch 176 disposed in junction box 174 serves to control the operation of the heating coil 169 in bar 167, energy for this heating coil being supplied through the cable 177.

The control and operating mechanism for the main drive clutch 23 is best shown in Figs. 4, 9, 10, and 15, and comprises a yoke 178 pivotally mounted on a block 179 secured to lower cross frame member 17, yoke 178 engaging the driven clutch element 24 to engage and disengage the same with driving clutch element 22. Driven clutch element 24 is normally held in engagement with driving clutch element 22 by a compression spring 180 disposed between the clutch element 24 and the sprocket which drives chain 40. The upper end of yoke 178 is pivotally connected to a link 181 forming one portion of a toggle the other portion of this toggle being formed by a link 182 pivotally mounted at 183 on an arm 184. Arm 184 is pivotally supported at 185 from cross member 18 of frame 10. The opposite end of arm 184 is provided with a cam follower 186 which is adapted to be engaged with a cam portion 187 on cam 38 carried by cam shaft 31 and the operation of cam 187 and follower 186 will be presently described.

Link 181 forming part of the toggle is connected to a bar 188 extending transversely of the machine bar 188 being provided outwardly of the frame 10 with a slot 189. Slidably received in slot 189 is a pin 190 secured to an arm 191 which in turn is fixed to a shaft 192 extending along one side of the machine and supported in brackets 193 secured to the frame 10. A second arm 194 is also attached to the shaft 192 and to this arm 194 is connected a control rod 195 extending upwardly through a guide 196 secured to the frame of the machine there being a handle 197 on the upper end of rod 195 which may be grasped by the hand of the operator to start and stop the machine. Also secured to the bar 188 is a cable 198 which is connected to the cigar banding and cellophane wrapping machine to which cigars are delivered from the piercing machine and in the event of failure or breakdown of the wrapping machine cable 198 will be pulled to disengage clutch 23 and stop operation of the cigar piercing machine.

The toggle formed by links 181 and 182 is normally urged toward dead center position by a tension spring 199 connected to the link 182 and a fixed portion of the machine. There is also provided a stop pin 200 on the link 181 which will engage the upper edge of link 182 upon straightening of the toggle and will prevent movement of the same beyond the dead center position.

With the toggle broken as shown in Figs. 4 and 15 the clutch 23 will be engaged to initiate operation of the cigar piercing apparatus but immediately upon the cam shaft 31 commencing to rotate cam 187 will be disengaged from cam follower 186 and consequently the toggle will move to dead center position under the influence of tension spring 199. Operation of the piercing machine will continue until the cam shaft 31 makes one revolution at which time cam 187 will engage cam follower 186 and due to the fact that the toggle is in dead center position will move the yoke 178 toward the left as viewed in Fig. 4 to disengage clutch 23 and stop operation of the machine.

The toggle is broken to again initiate operation of the machine by a bar 201 pivotally mounted on uprights 202 extending from the gear box 26 bar 201 being provided with a finger 203 which extends over the upper portion of the toggle and upon clockwise movement of the bar 201 and finger 203 as viewed in Figs. 9 and 10 finger 203 will engage the upper surface of the toggle and move the links 181 and 182 downwardly against the action of spring 199 to break the toggle and permit movement of the yoke 178 toward the right as viewed in Fig. 4 to reengage the clutch 23 and again initiate operation of the machine. Bar 201 is actuated in timed relation to the cigar banding and wrapping machine by a portion thereof 204 which is in engagement with a cam 205 carried by a shaft 206 which forms a part of the banding and wrapping machine. Shaft 206 operates in such a timed relation to the operations of the banding machine that operation of the cigar piercing machine will be initiated in order to supply cigars to the banding and wrapping machine in the proper relationship thereto.

It will therefore be seen that the toggle control mechanism for the clutch 23 operating in conjunction with the cam 187 carried by cam 38 is in effect a one revolution clutch which upon starting the operation of the machine permits one revolution of the cam shaft 31 and during this one revolution all of the functions of the piercing machine are carried out.

Clutch 43 is also a one revolution clutch which controls operation of the conveyor chains 92 and 93 for conveying pierced cigars from this apparatus to the cigar banding and wrapping machine. The operation of clutch 43 as shown in Figs. 2, 9 and 10 is controlled by a yoke 207 pivotally mounted at 208 on the frame 10 of the machine and the driven clutch member 44 is normally held in engagement with driving clutch member 42 by a compression spring 209 positioned between the driven clutch member 44 and a collar 210 mounted on the shaft 45. The sprocket timing wheel 51 as best shown in Figs. 9 and 10 is provided with a stud 211 adjustably mounted in an arcuate slot 212. Stud 211 is provided on the inner end thereof with a pivoted latch 213 which is normally held in the position shown in Figs. 9 and 10 by a tension spring 214 extending from this latch to a pin 215 secured to the sprocket 51. The yoke 207 has an arm extending upwardly into the path of movement of latch 213 and upon rotation of the sprocket 51 latch 213 will engage the yoke 207 and move the same toward the left as viewed in Fig. 2 to disengage the clutch 43 and stop operation of the conveyor chains 92 and 93.

In order to engage the clutch 43 and initiate operation of the conveyor chains 92 and 93 there is provided a latch trip arm 216 pivotally mounted on a bracket 217 attached to frame 10 of the machine, arm 216 having a laterally extending trip portion 218 which may engage the latch 213 to trip the same. As shown in Fig. 9 the trip arm 216 is provided with a cam follower 219 in engagement with a cam 37 carried by cam shaft 31 and cam follower 219 is held in engagement with this cam by a tension spring 220 attached to the trip arm 216 and to a fixed portion of the machine. As shown in Fig. 9 upon rotation of the cam shaft 31 the trip arm 216 will be moved downwardly and the laterally extending trip portion 218 will engage the latch 213 to trip the same and permit movement of the yoke 207 toward the right as viewed in Fig. 2 thus engaging the clutch 43 and initiating operation of the conveyor chains 92 and 93. Upon the sprocket 51 making one complete revolution the latch 213 will again engage the yoke 207 and move the same toward the left to disengage the clutch 43 and stop operation of the conveyor chain 92 and 93. At this time one layer or row of cigars which were disposed on the rails 89, 90 and 91 will have been moved out of the machine by reason of the engagement of lugs 97 and 98 with the cigars and these lugs will be again positioned to move the next row of cigars.

In operation it is only necessary to place a stack of cigars 54 in the hopper 53 and to initiate operation of the machine by engaging the main drive clutch 23. At this time cam shaft 31 will commence to revolve and the feed slide 77 will be actuated by the cam groove 82 and cam 38 to eject the lowermost row of cigars in the hopper 53 onto the rails 89, 90 and 91. Upon movement of the cigars 54 onto these rails operation of cam 39 in engagement with arm 105 will actuate cams 109 to move the clamping bar 99 downwardly into engagement with the cigars and to clamp the same firmly on the rails 89, 90 and 91. Also at this same time operation of the cam 35 will permit movement of the spacing slides 110 and spacing fingers 113 downwardly between the cigars to separate the same in groups of five at which time the cigars 54 are in position and ready for the piercing operation.

Cam 36 will then operate to move the cavities 127 in the heads 126 of plungers 124 into engagement with each individual cigar and accurately center and position the same for the piercing operation and subsequent to this positioning cam follower 166 running in cam groove 82 of cam 38 will move the carriage 144 inwardly toward the cigars to project the heated needles 142 through the bores 133 of the plungers 124 and into the cigars to pierce the same. It is of course assumed that the motor 161 is operating and that the needles 142 are rotating and that the heating element 169 is in operation to bring the needles to the proper temperature. This will result in the proper piercing of the cigars and upon withdrawal of the needles 142 the cigars will appear as in Fig. 18 with an aperture 221 in the end thereof.

Continued rotation of the cam shaft 131 will result in withdrawing the needles 142 and the plungers 124 and at this time cam 37 will operate to move the trip bar 216 and trip the latch 213 on sprocket 51 this resulting in initiating operation of the conveyor chains 92 and 93 which will move the entire row of pierced cigars along the rails 89, 90 and 91 and to the banding and wrapping machine. Upon the sprocket 51 making one complete revolution the clutch 43 will be disengaged to stop operation of the conveyor chains 92 and 93 and the lugs 97 and 98 carried thereby will be in proper position to engage the next row of cigars. Also at this time the cam 187 on cam 38 has engaged the follower 186 to move the links 181 and 182 comprising a toggle and the yoke 178 carried thereby toward the left as viewed in Fig. 4 to disengage the clutch 23 thus stopping operation of the entire machine.

At the proper time with relation to the operation of the banding and wrapping machine cam 205 carried by shaft 206 will move portion 204 of rod 201 to bring the finger 203 into engagement with the upper side of the link 181 forming part of the toggle to break this toggle and thus permit movement of the yoke 178 toward the right as viewed in Fig. 4 to reengage the clutch 23 and thus again initiate operation of the machine which will continue through another cycle. These cycles of operation will continue in succession until it is desired to stop the machine by actuation of the handle 197 or by reason of a breakdown or failure in the banding and wrapping machine at which time the cable 198 will be pulled toward the left as viewed in Fig. 4 to thus move the yoke 178 and disengage the clutch 23.

It will thus be seen that by the above described invention there has been provided an efficiently operating cigar piercing machine which is entirely self controlled and automatic in operation and which may be operated in timed relation to a cigar banding and wrapping machine to which pierced cigars may be delivered. Obviously this machine may be constructed from readily available parts and presents an apparatus which is substantially free from danger of breakdowns with consequent loss of time and increased operating costs.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A cigar piercing machine comprising a frame, a main drive motor carried by said frame, a cam shaft driven by said motor, a clutch between said motor and said cam shaft, a toggle mechanism for controlling engagement and disengagement of said clutch, means for operating said mechanism to engage said clutch, cam means carried by said cam shaft for operating said toggle mechanism to disengage said clutch after one revolution of said cam shaft, a hopper for receiving cigars in layers, a feed slide for feeding the lowermost layer of cigars from said hopper, cam means on said cam shaft for actuating said feed slide, spaced substantially parallel rails for receiving a layer of cigars fed from said hopper by said feed slide, vertically movable yieldable clamping means for clamping a layer of cigars in place on said rails, clamp actuating cam means for engaging said clamping means to move the same into clamping position and resilient means for returning said clamping means to cigar releasing position, cam means on said cam shaft operably connected with said clamp actuating cam means, cigar spacing means vertically movable toward and from cigars disposed on said rails to separate said cigars into groups of a predetermined number, cam means on said cam shaft for actuating said cigar spacing means, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a conical recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for simultaneously rotating said spindles, heating means for said needles comprising a bar extending transversely of said frame, said bar having a plurality of apertures for slidably receiving each needle, an electrical heating means in said bar whereby upon movement of said carriage toward said cigars, said needles will pass through the bores in said plungers and pierce said cigars to a predetermined depth and means for conveying pierced cigars away from said machine comprising spaced chains disposed between said rails, lugs on said chains for engaging said cigars, drive means for said chains including a clutch, resilient means for engaging said clutch, a timing wheel, a yoke for disengaging said clutch, a latch adjustably mounted on said timing wheel for engaging said yoke to disengage said clutch after one revolution of said chains and trip means actuated by a cam on said cam shaft to trip said latch and permit engagement of said clutch to actuate said chains.

2. A cigar piercing machine comprising a frame, a drive motor carried by said frame, a cam shaft driven by said motor, a clutch between said motor and said cam shaft, mechanism for controlling engagement and disengagement of said clutch, means for operating said mechanism to engage said clutch, cam means carried by said cam shaft for operating said mechanism to disengage said clutch after one revolution of said cam shaft, a hopper for receiving cigars in layers, a feed slide for feeding the lowermost layer of cigars from said hopper, cam means on said cam shaft for actuating said feed slide, spaced rails for receiving a layer of cigars fed from said hopper by said feed slide, vertically movable yieldable clamping means for clamping a layer of cigars in place on said rails, cam means on said cam shaft operably connected with said clamping means for actuating the same, cigar spacing means vertically movable toward and from cigars disposed on said rails to separate said cigars into groups of a predetermined number, cam means on said cam shaft for actuating said cigar spacing means, individual cigar centerng means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles, heating means for said needles whereby upon movement of said carriage toward said cigars said needles will pass through the bores of said plungers and pierce said cigars to a predetermined depth and means for conveying pierced cigars away from said machine comprising spaced chains disposed between said rails, lugs on said chains for engaging said cigars, drive means for said chains including a clutch, resilient means for engaging said clutch, a timing wheel, a yoke for disengaging said clutch, a latch adjustably mounted on said timing wheel for engaging said yoke to disengage said clutch after one revolution of said chains and trip means atcuated by a cam on said cam shaft to trip said latch and permit engagement of said clutch to actuate said chains.

3. A cigar piercing machine comprising a frame, a drive motor carried by said frame, a cam shaft driven by said motor, a clutch between said motor and said cam shaft, mechanism for controlling engagement and disengagement of said clutch, means for operating said mechanism to engage said clutch, cam means carried by said cam shaft for operating said mechanism to disengage said clutch after one revolution of said cam shaft, a hopper for receiving cigars in layers, a feed slide for feeding the lowermost layer of cigars from said hopper, cam means on said cam shaft for actuating said feed slide, spaced rails for receiving a layer of cigars fed from said hopper by said feed slide, vertically movable yieldable clamping means for clamping a layer of cigars in place on said rails, cam means on said cam shaft operably connected with said clamping means for actuating the same, cigar spacing means vertically movable toward and from cigars disposed on said rails to separate said cigars into groups of a predetermined number, cam means on said cam shaft for actuating said cigar spacing means, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles, heating means for said needles whereby upon movement of said carriage toward said cigars said needles will pass through the bores in said plungers and pierce said cigars and means for conveying pierced cigars away from said machine comprising spaced chains disposed between said rails, lugs on said chains for engaging said cigars, drive means for said chains including a clutch, a timing wheel, a yoke for disengaging said clutch, a latch mounted on said timing wheel for engaging said yoke to disengage said clutch after one revolution of said chains and trip means actuated by a cam on said cam shaft to trip said latch and permit engagement of said clutch to actuate said chains.

4. A cigar piercing machine comprising a frame, a drive motor carried by said frame, a cam shaft driven by said motor, a clutch between said motor and said cam shaft, mechanism for controlling engagement and disengagement of said clutch, means for operating said mechanism to engage said clutch, cam means carried by said cam shaft for operating said mechanism to disengage said clutch after one revolution of said cam shaft, a hopper for receiving cigars in layers, a feed slide for feeding the lowermost layer of cigars from said hopper, cam means on said cam shaft for actuating said feed slide, spaced rails for receiving a layer of cigars fed from said hopper by said feed slide, vertically movable yieldable clamping means for clamping a layer of cigars in place on said rails, cam means on said cam shaft operably connected with said clamping means for actuating the same, cigar spacing means vertically movable toward and from cigars disposed on said rails to separate said cigars into groups of a predetermined number, cam means on said cam shaft for actuating said cigar spacing means, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles, heating means for said needles whereby upon movement of said carriage toward said cigars said needles will pass through the bores in said plungers and pierce said cigars and means for conveying pierced cigars away from said machine.

5. A cigar piercing machine comprising a frame, a drive motor carried by said frame, a cam shaft driven by said motor, a clutch between said motor and said cam shaft, mechanism for controlling the engagement and disengagement of said clutch, means for operating said mechanism to engage said clutch, cam means carried by said cam shaft for operating said mechanism to disengage said clutch after one revolution of said cam shaft, a hopper for receiving cigars in layers, a feed slide for feeding the lowermost layer of cigars from said hopper, cam means on said cam shaft for actuating said feed slide, spaced rails for receiving a layer of cigars fed from said hopper by said feed slide, vertically movable yieldable clamping means for clamping a layer of cigars in place on said rails, cam means on said cam shaft operably connected with said clamping means for actuating the same, cigar spacing means vertically movable toward and from cigars disposed on said rails to separate said cigars into groups of a predetermined number, cam means on said cam shaft for actuating said cigar spacing means, individual cigar centering means comprising a block extending transversely of said frame and mounted for reciprocating movement toward and from said cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles and heating means for said needles whereby upon movement of said carriage toward said cigars said needles will pass through the bores in said plungers and pierce said cigars.

6. A cigar piercing machine comprising a frame, a drive motor carried by said frame, a cam shaft driven by said motor, a clutch between said motor and said cam shaft, mechanism for controlling engagement and disengagement of said clutch, means for operating said mechanism to engage said clutch, cam means carried by said cam shaft for operating said mechanism to disengage said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable yieldable clamping means for clamping cigars in place on said rails, cam means on said cam shaft operably connected with said clamping means for actuating the same, cigar spacing means vertically movable toward and from cigars disposed on said rails to separate said cigars into groups of a predetermined number, cam means on said cam shaft for actuating said cigar spacing means, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby engagement of said plunger with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles and heating means for said spindles whereby upon movement of said carriage toward said cigars said needles will pass through the bores in said plungers and pierce said cigars.

7. A cigar piercing machine comprising a frame, a drive motor carried by said frame, a cam shaft driven by said motor, a clutch between said motor and said cam shaft, mechanism for controlling engagement and disengagement of said clutch, means for operating said mechanism to engage said clutch, cam means carried by said cam shaft for operating said mechanism to disengage said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable yieldable clamping means for clamping cigars in place on said rails, cam means on said cam shaft operably connected with said clamping means for actuating the same, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars, said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles and heating means for said needles whereby upon movement of said carriage toward said cigars said needles will pass through the bores in said plungers and pierce said cigars.

8. A cigar piercing machine comprising a frame, a drive motor carried by said frame, a cam shaft driven by said motor, a clutch between said motor and said cam shaft, means for engaging said clutch, cam means carried by said cam shaft for disengaging said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable clamping means for clamping cigars in place on said rails, cam means on said cam shaft operably connected with said clamping means for actuating the same, individual cigar centering means comprising a block extending transversely of said frame and mounted for reciprocating movement toward and from cigars clamped on said rails, cam means on said cam shaft for moving said block toward said cigars, a plurality of plungers slidably mounted in said block, each plunger having a recess facing said cigars, individual resilient means for yieldably urging each of said plungers into engagement with said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of spindles rotatably mounted on said carriage, a piercing needle carried by each spindle in axial alignment with the bore in each plunger, means on said carriage for rotating said spindles and heating means for said needles whereby upon movement of said carriage toward said cigars said needles will pass through the bores in said plungers and pierce said cigars.

9. A cigar piercing machine comprising a frame, a drive motor carried by said frame, a cam shaft driven by said motor, a clutch between said motor and said cam shaft, means for engaging said clutch, cam means carried by said cam shaft for disengaging said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable clamping means for clamping cigars in place on said rails, cam means on said cam shaft operably connected with said clamping means for actuating the same, individual cigar centering means mounted for reciprocating movement toward and from cigars clamped on said rails, cam means on said cam shaft for moving said centering means toward said cigars, said centering means including a plurality of slidable plungers, each plunger having a recess facing said cigars, each of said plungers having a bore therethrough whereby upon engagement of said plungers with said cigars said bores will be axially aligned therewith, a carriage reciprocably mounted on said frame for movement toward and from said cigars, cam means on said cam shaft for reciprocating said carriage, a plurality of piercing needles rotatably mounted on said carriage in axial alignment with the bore in each plunger and means on said carriage for rotating said needles whereby upon movement of said carriage toward said cigars said needles will pass through the bores in said plungers and pierce said cigars.

10. A cigar piercing machine comprising a frame, a drive motor carried by said frame, a cam shaft driven by said motor, a clutch between said motor and said cam shaft, means for engaging said clutch, cam means carried by said cam shaft for disengaging said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable clamping means for clamping cigars in place on said rails, cam means on said cam shaft operably connected with said clamping means for actuating the same, individual cigar centering means mounted for reciprocating movement toward and from cigars clamped on said rails, cam means on said cam shaft for moving said centering means toward said cigars, said centering means including a plurality of recesses facing said cigars, said centering means having a bore coaxial with each recess whereby upon engagement of said recesses with said cigars said bores will be axially aligned therewith, a carriage reciprocably mounted on said frame for movement toward and from said cigars, cam means on said cam shaft for reciprocating said carriage, a plurality of piercing needles rotatably mounted on said carriage in axial alignment with said bores and means on said carriage for rotating said needles whereby upon movement of said carriage toward said cigars said needles will pass through said bores and pierce said cigars.

11. A cigar piercing machine comprising a frame, a drive motor carried by said frame, a cam shaft driven by said motor, a clutch between said motor and said cam shaft, means for engaging said clutch, cam means carried by said cam shaft for disengaging said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable clamping means for clamping said cigars in place on said spaced rails, individual cigar centering means mounted for reciprocating movement toward and from cigars on said rails, said individual centering means including means to compensate for small inaccuracies of lengths of the cigars on said spaced rails, cam means on said cam shaft for moving said centering means toward said cigars, said centering means including a plurality of recesses facing said cigars, said centering means having a bore coaxial with each recess whereby upon engagement of said recesses with said cigars said bores will be axially aligned therewith, a carriage reciprocably mounted on said frame for movement toward and from said cigars, cam means on said cam shaft for reciprocating said carriage, a plurality of piercing needles rotatably mounted on said carriage in axial alignment with said bores and means on said carriage for rotating said needles whereby upon movement of said carriage toward said cigars said needles will pass through said bores and pierce said cigars.

12. A cigar piercing machine comprising a frame, a drive motor carried by said frame, a cam shaft driven by said motor, a clutch between said motor and said cam shaft, means for engaging said clutch, cam means carried by said cam shaft for disengaging said clutch after one revolution of said cam shaft, a hopper for receiving cigars, a feed slide for feeding cigars from said hopper, cam means on said cam shaft for actuating said feed slide, spaced rails for receiving cigars fed from said hopper by said feed slide, vertically movable clamping means for clamping said cigars in place on said spaced rails, individual cigar centering means mounted for reciprocating movement toward and from cigars on said rails, said individual centering means including means to compensate for small inaccuracies of lengths of the cigars on said spaced rails, cam means on said cam shaft for moving said centering means toward said cigars, a carriage reciprocbly mounted on said frame for movement toward and from said cigars, cam means on said cam shaft for reciprocating said carriage, a plurality of piercing needles rotatably mounted on said carriage and means on said carriage for rotating said needles whereby upon movement of said carriage toward said cigars said needles will pierce said cigars.

13. A cigar piercing machine comprising a frame, a cam shaft rotatably mounted on said frame, drive means for said cam shaft, a clutch between said drive means and said cam shaft, means for engaging said clutch cam means carried by said cam shaft for disengaging said clutch after rotation of said cam shaft through a predetermined arc, a hopper for receiving cigars, means for feeding cigars from said hopper, cam means on said cam shaft for actuating said feeding means, spaced rails for receiving cigars fed from said hopper by said feeding means, vertically movable clamping means for clamping said cigars in place on said spaced rails, individual cigar centering means mounted for individual reciprocating movement toward and from cigars on said rails, said individual centering means including means to compensate for small inaccuracies of lengths of the cigars on said spaced rails, cam means on said cam shaft for moving said centering means toward said cigars, a carriage reciprocably mounted on said frame for movement toward and from said cigars, cam means on said cam shaft for reciprocating said carriage, a plurality of piercing needles rotatably mounted on said carriage and means on said carriage for rotating said needles whereby upon movement of said carriage toward said cigars said needles will pierce said cigars.

14. A cigar-piercing machine comprising a frame, a hopper for receiving cigars, means for feeding cigars from said hopper, spaced rails for receiving a plurality of cigars fed from said hopper by said feeding means, vertically movable clamping means for clamping said cigars in place on said spaced rails, individual cigar centering means mounted for reciprocating movement toward and from the ends of said cigars on said spaced rails, said individual cigar centering means including means to compensate for small inaccuracies of lengths of the cigars on said spaced rails, means for moving said centering means toward said cigars, a carriage reciprocably mounted on said frame for movement toward and from said cigars, means for reciprocating said carriage, a plurality of piercing needles rotatably mounted on said carriage and means on said carriage for rotating said needles whereby upon movement of said carriage toward said cigars said needles will pierce said cigars, a heating bar rigidly mounted on said frame and having openings which said needles extend through, said openings being of a size to closely fit around and to substantially contact said needles, said bar being positioned to fit around said needles with the needle points extending beyond the bar slightly, in their withdrawn positions, said bar having heating means within capable of keeping said bar at an even temperature.

15. In a cigar piercing machine having a plurality of piercing needles rotatably and reciprocatably mounted, the improvement comprising a rigidly mounted heating bar having openings which the needles extend through, said openings being of a size to closely fit around and to substantially contact the needles, said bar being positioned to fit around the needles with the needle points extending beyond the bar slightly in their withdrawn positions, said bar having heating means within capable of keeping said bar at an even temperature for heating the needles.

References Cited in the file of this patent

UNITED STATES PATENTS

| 2,065,995 | Dorfman | Dec. 29, 1936 |
| 2,149,346 | Ibold et al. | Mar. 7, 1939 |
| 2,244,142 | Clausen | June 3, 1941 |
| 2,250,452 | Alm | July 29, 1941 |
| 2,277,686 | Blount | Mar. 31, 1942 |
| 2,331,506 | Redford et al. | Oct. 12, 1943 |